Figures 1, 2:
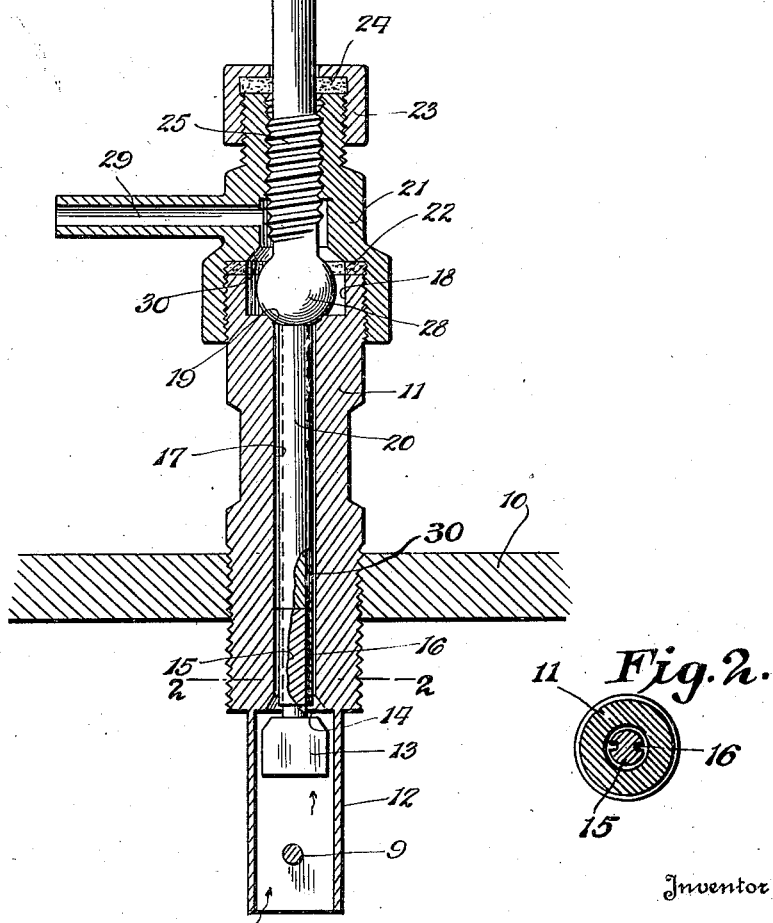

June 10, 1924.

P. L. RYAN 1,497,230

TRIPLE SAFETY GAUGE COCK

Filed May 18, 1922

Inventor

P. L. Ryan.

By

Lacey & Lacey, Attorneys

Patented June 10, 1924.

1,497,230

UNITED STATES PATENT OFFICE.

PAUL L. RYAN, OF CONNEAUT, OHIO.

TRIPLE SAFETY GAUGE COCK.

Application filed May 13, 1922. Serial No. 561,937.

*To all whom it may concern:*

Be it known that I, PAUL L. RYAN, a citizen of the United States, residing at Conneaut, in the county of Ashtabula and State of Ohio, have invented certain new and useful Improvements in Triple Safety Gauge Cocks, of which the following is a specification.

My invention relates to safety cocks for steam boilers and has for its main object to provide a gauge cock of this class that may be closed in three different ways; in other words, it is provided with one cut-off inside of the boiler and two others outside thereof. In this manner, if the first and second cut-offs should fail to work, the third one would still be available to close the steam outlet.

Should, for any reason, the cock handle and valve bonnet be knocked off, the inner valve would be automatically closed by the steam pressure behind it. The bonnet may then be repaired and replaced whereupon the inner valve may again be opened by turning the cock handle to the right if its stem is right hand threaded, thereby unseating the inner valve.

In Figure 1 of the accompanying drawing a longitudinal section of the safety gauge cock is illustrated and Figure 2 is a transverse section on line 2—2 of Figure 1.

The reference numeral 10 indicates the boiler into which the valve body 11 is threaded so as to open internally of the boiler. The inner end of the body 11 has a cylindrical extension 12 forming a housing for the inner valve 13 which is adapted to be seated in the conical seat 14 provided at the bottom of the cylindrical extension 12. In order to prevent the valve 13 from falling out of the housing 12 the pin 9 secured in the housing blocks the passage inwardly of the valve 13. Sufficient space is allowed between the head of the valve 13 and the inner wall of the housing 12 to permit steam to pass around and by the valve head. The valve 13 has a shank 15 which is preferably grooved, as at 16, and fits loosely in the axial bore 17 of the valve body 11. This bore extends to the opposite end of the body and terminates in a large chamber 18 provided with a second valve seat 19 at its bottom. As will be noted from the drawing, the shank 15 extends only a short distance into the bore 17, which for the rest of its length is filled by an intercepting rod 20, also grooved, as at 30 in a similar manner, to the shank 15.

On the outer end of the body 11 is threaded a bonnet 21 drawn down tightly on the body 11 over a suitable packing 22 to form a tight joint. The opposite end of the bonnet 21 is threaded to receive a cap or packing nut 23, which also is screwed down over a packing 24. This end of the bonnet has an internal thread adapted to engage with the threaded portion 25 of a stem 26 which at its outer end has a wheel or handle 27 rigidly secured thereon. The inner end of the stem 26 terminates with a ball head 28 which is smaller in diameter than the chamber 18 formed in the body 11 leaving a passage around the same leading to an outlet or vent 29. Below this vent the bonnet 21 has a valve seat 30 for the ball head 28.

Supposing the parts are in the position shown in the drawing, that is to say, the ball head 28 is engaged in the seat 19 in the upper or outer end of the body 11, the outlet will in this manner be closed by the ball head. To open the valve the handle 27 has to be turned to the left or in the direction of the arrow X when the ball head 28 will be retracted and the steam behind the valve 13 will press the same outwardly and passing through the grooves 16 in the shank 15 and the intercepting rod 20 will continue through the chamber 18 past the head 28 and out of the vent 29.

To close the valve in this position, the handle 27 is again turned to the left, when the intercepting rod 20 and the valve 13 will follow, actuated by the steam pressure, until the valve 13 is seated in its seat 14 thereby closing the outlet.

Should now, for any reason, the steam pressure behind the valve 13 be insufficient to seat the latter, the handle 27 may be again turned in the direction of the arrow X until the ball head 28 engages in its upper or outer seat 30, when the steam outlet to the vent 29 will in this manner be closed.

Similarly, should the seat 19 fail to cooperate with the ball head 28, the gauge cock may be closed by turning the handle 27 in the direction of arrow X until the ball head 28 is engaged in the seat 30.

To open the valve from this position, the handle has to be turned to the right or in the direction opposite to that indicated by the arrow, until the inner valve 13 becomes unseated.

From the foregoing description it will be readily understood that any escape of steam unless desired, through the vent 29, is practically impossible.

The reasons for failure to close the cock are apparently only two, namely that either the valve stem 26 sticks in the bonnet or the inner valve or its intercepting rod 20 cannot be moved in the valve body 11. In the former case the remedy is to detach the bonnet 21 with the valve head 28, when the steam pressure in the boiler will close the inner valve 13.

If grit should have lodged in the bore 17 of the valve body 11, so that the valve 13 or the rod 20 cannot move actuated by steam pressure, the rod and the valve 13 may be forced inwardly by screwing down the stem 26 until the valve head engages in the seat 19. Should the rod 20 and valve 13 stick so hard that they cannot be moved in this manner, the last resort will be to unscrew the stem 26, when ultimately the ball head 28 will be seated in the outer valve seat 30.

Having thus described the invention, what is claimed as new is:

1. In a device of the class described, a valve body having a bore terminating with a valve seat at each end and adapted to extend with one end into a boiler, a valve adapted to engage in the seat at the boiler end and having a shank guided in said bore, a manually operated valve adapted to engage in the other of said seats, and a spacing member in said bore between said valves, said member permitting the seating of only one of said valves at a time, a bonnet secured on the outer end of said body and providing a chamber between the bonnet and said body with a seat for said manually operated valve, said chamber being normally opened to the atmosphere and adapted to be closed to the atmosphere when the manually operated valve is in engagement with the seat in the bonnet.

2. In a device of the class described, a valve body having a bore terminating with a valve seat at each end and adapted to extend with one end into a boiler, a valve adapted to engage in the seat at the boiler end and having a shank guided in said bore, a manually operated valve adapted to engage in the other of said seats, and a spacing member in said bore between said valves, said member permitting the seating of only one of said valves at a time, a bonnet secured on the outer end of said body and providing a chamber between the bonnet and said body with a seat for said manually operated valve, said chamber having a port opening to the atmosphere and situated beyond said last-mentioned valve seat.

3. In a device of the class described, a valve body having a bore terminating with a valve seat at each end and adapted to extend with one end into a boiler, a valve adapted to engage in the seat at the boiler end and having a shank guided in said bore, a manually operated valve adapted to engage in the other of said seats, and a spacing member in said bore between said valves, said member permitting the seating of only one of said valves at a time, a bonnet secured on the outer end of said body and providing a chamber between the bonnet and said body with a seat for said manually operated valve, said chamber having a port opening to the atmosphere and situated beyond said last-mentioned valve seat, and grooves being provided in said spacing member and said shank providing communication between the interior of the boiler and said chamber.

In testimony whereof I affix my signature.

PAUL L. RYAN. [L. S.]